(12) United States Patent
Slater et al.

(10) Patent No.: US 7,702,763 B2
(45) Date of Patent: Apr. 20, 2010

(54) REMOTE MONITORING OF COMPUTER DEVICES

(75) Inventors: Alastair Michael Slater, Malmesbury (GB); Mark Robert Watkins, Bristol (GB); Andrew Michael Sparkes, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1419 days.

(21) Appl. No.: 10/207,802

(22) Filed: Jul. 31, 2002

(65) Prior Publication Data

US 2003/0028829 A1 Feb. 6, 2003

(30) Foreign Application Priority Data

Jul. 31, 2001 (GB) ................... 0118665.9

(51) Int. Cl.
G06F 15/173 (2006.01)
(52) U.S. Cl. .............. 709/223; 709/224; 370/249; 340/557; 340/539; 340/525
(58) Field of Classification Search .......... 709/224, 709/223; 370/249; 340/557, 539, 525
See application file for complete search history.

(56) References Cited

U.S. PATENT DOCUMENTS

| | | | |
|---|---|---|---|
| 4,695,946 A | | 9/1987 | Andreasen et al. |
| 5,559,496 A * | | 9/1996 | Dubats .................. 340/539.26 |
| 5,832,204 A | | 11/1998 | Apperley et al. |
| 5,926,448 A * | | 7/1999 | Yokota et al. ............ 369/47.33 |
| 6,449,739 B1 * | | 9/2002 | Landan ........................ 714/47 |
| 6,477,667 B1 * | | 11/2002 | Levi et al. ..................... 714/57 |
| 6,505,245 B1 * | | 1/2003 | North et al. ................. 709/223 |
| 6,633,861 B2 * | | 10/2003 | Hart et al. ..................... 706/47 |
| 6,728,262 B1 * | | 4/2004 | Woram ........................ 370/466 |
| 6,738,813 B1 * | | 5/2004 | Reichman ................... 709/224 |
| 6,834,155 B1 * | | 12/2004 | Taniguchi .................... 386/68 |
| 7,150,014 B2 * | | 12/2006 | Graupner et al. ............ 717/174 |
| 7,281,040 B1 * | | 10/2007 | Ly .............................. 709/224 |
| 2002/0091753 A1 * | | 7/2002 | Reddy et al. ................. 709/202 |
| 2002/0112238 A1 * | | 8/2002 | Kanojia et al. ................ 725/42 |
| 2002/0120681 A1 * | | 8/2002 | Cho et al. .................... 709/203 |

FOREIGN PATENT DOCUMENTS

| | | |
|---|---|---|
| EP | 0 671 686 A1 | 9/1995 |
| EP | 0 910 019 A2 | 4/1999 |
| GB | 2 298 940 A | 9/1998 |
| WO | WO 92/03789 | 3/1992 |
| WO | WO 00/74340 | 12/2000 |
| WO | 01/33513 A1 | 5/2001 |

* cited by examiner

Primary Examiner—Tammy T Nguyen

(57) ABSTRACT

A management data distribution apparatus has, a control unit, a buffer memory element, at least one input port, and a telecommunications output. The at least one input port is arranged to receive management data from devices located within a network and to pass the management data to the control unit. The control unit is arranged to control output of the management data via the telecommunications output to a remote monitoring site over a telecommunications network. The control unit is also arranged to store management data arriving at the at least one input port when the said telecommunications output is in use in the buffer memory element, temporarily.

26 Claims, 6 Drawing Sheets

REMOTE MONITORING OF COMPUTER DEVICES

FIELD OF THE INVENTION

This invention relates to the remote monitoring of computer devices, and to apparatus to monitor devices remotely.

BACKGROUND TO THE INVENTION

It is becoming more and more important to monitor the performance of computers and computer/processor controlled devices as they become more and more critical to the proper performance of machines and businesses. For example, many financial institutions, or other transaction-based businesses, rely on computers to track and record transactions, events, and the current status of data in their systems. Failure of a memory unit of a data storage/record computer can be disastrous for a business. It is known to use RAID techniques to minimise the risks of the failure of a single hard disc bringing down a data record and management system. So called "data centres" exist to which organisations can outsource the management of their mission—critical data management and storage. A fee is paid to the data centres for housing the data records and managing them. Top quality hard discs are used in such data centre data recording/management devices. These are of better quality than "high street" hard drives and are more robust and tolerant of their environment. Each disc array may typically be able to hold a Tb of data. Since the data record computers of data centres are so critical to the operation of the data centre, and of their customers, even with RAID techniques it is common to have the further safety system of monitoring the performance and characteristics of each data storage/management device in the data centre. Typically a data centre storage device may have monitored its physical orientation, its temperature, read or write errors for each disc of the disc arrays monitored, disc failure monitored, and include any other parameter or value which may be helpful to indicate a need to repair or maintain the device. This device operational capability/influencing data is communicated to the data centre network operations centre (i.e. the organisation that is responsible for maintaining the data centre) by a dedicated telephone line. This provides "phone-home" capability: the device automatically telephones its "owner" to report malfunctions, or things which may cause malfunction (or indeed to report anything else that it is configured to report). This up to date information is very valuable to the "owner" of the device/data centre manager.

Some organisations may have many data recording and management devices in a data centre, possibly 20 or more. Each device has its own dedicated telephone line. Each line may cost of the order of $100-$200 per month. This phone line rental costs $4000 per month, or more, are possible for organisations which have many devices at a data centre. This is perceived as simply the price of doing business. A cheaper alternative would be to have each device post its "phone-home" alert data onto its own webpage of its devices. However, putting sensitive data on the web does not come naturally to discrete careful organisations such as banks, share traders, and other businesses, for security reasons. Thus dedicated land-based telephone lines are preferred which are permanently connected to the customers own monitoring computers.

Each disc controller (or other peripheral having a management system, for example a tape controller) may have dedicated telephone connection to a service centre. Should a problem or fault be noted the controller telephones the disc manufacturer and informs them of the situation. As each disc controller requires its own telephone line this can be a costly exercise.

Remote back up systems for data centres where each data storage device, or disc array, has a dedicated output phone line are known, see for example EP 0 910 019.

Also, the upload of control data, for example peripheral component configuration data, is possible and is discussed in U.S. Pat. No. 4,695,946.

SUMMARY OF THE INVENTION

It is an aim of at least one embodiment of the invention to provide a new way of monitoring a remote data recording/management device and preferably of monitoring a plurality of remote data recording/management devices.

According to a first aspect of the present invention there is provided a management data distribution apparatus comprising:

a control unit;

a buffer memory element;

at least one input port;

a telecommunications output;

said at least one input port being arranged to receive management data from a plurality of devices located within a network and to pass said management data to said control unit, said control unit being arranged to control output of said management data via said telecommunications output to a remote monitoring site over a telecommunications network and to store management data arriving at said at least one input port when said telecommunications output is in use in said buffer memory element, temporarily.

There may be a single telecommunications connection operable at any one time arranged to link a plurality of devices to a remote monitoring station via the telecommunications network. There may be between any two of the following number of devices connected to the data management apparatus: 2, 10, 20, 30, 31 or more.

The data management apparatus may include a processor that may be arranged to determine whether the telecommunications connection is in use. The data management centre may include a buffer memory that may be arranged to store the data should the telecommunications connection be in use. The data management apparatus may contain the buffer memory. The data management apparatus may be arranged to output the data when the telecommunications connection is no longer in use.

The data management apparatus may include a logging device. The logging device may be arranged to record details of data either entering or exiting the data management apparatus. The logging device may be arranged to record data either entering or exiting the data management apparatus. The logging device may be the memory element.

The data management apparatus may include a sensor or a monitor that may be arranged to monitor the status of at least one parameter that may be indicative of the status of at least one device, or part of, the data centre.

The data management apparatus may include a logging device, which may or may not be the same as the first logging device. The logging device may be arranged to record at least one parameter that may be indicative of the status of at least one device, or part, of the data centre. The parameter may be provided in the form of a numerical value or an alphanumeric string.

The signal may contain an identifier associated with the any one device. The signal may contain data relating to the status of the any one device. The apparatus may be arranged to output the signal to a maintenance centre in response to the data relating to the status of the any one device.

The input port may be a peripheral component interconnect (PCI) board, as may be the output board. The PCI input board may be arranged to receive signals from an Ethernet. The input port and the output port may be combined on a single PCI board.

The memory element may be either or both of a non-volatile memory element or a buffer memory element. The non-volatile memory element may be a magnetic hard disc, or it may be a plurality of magnetic hard discs typically arranged in a RAID 1 arrangement. The memory element may be arranged to log data that enters or exits the apparatus and may be arranged to log the time and/or date of the data exiting the apparatus. The memory element may be arranged to retain a copy of data exiting the apparatus via the output port.

The processor may be arranged to inspect a signal from the output port in order to ascertain if the output port is in use. The processor may be arranged to write the signal to the buffer memory element if the signal from the output port indicated that the output port is in use.

The output port may be configurable to allow the upload of data from an external network element. The data may relate to any one, or combination of the following: internet protocol (IP) address of the apparatus, network mask, gateway. The data may relate to either the apparatus or any one of the devices.

The apparatus may be arranged within in firewall.

According to a second aspect of the present invention there is provided a data centre comprising:

a plurality of data storage devices;

a management data distribution apparatus including:

a control unit, a buffer memory element, at least one input port and a telecommunications output port;

a network including said data storage devices and said distribution apparatus;

said at least one input port being arranged to receive management data relating to at least one of said data serving devices and to pass said management data to said control unit, said control unit being arranged to output said management data via said telecommunications output to a remote monitoring site over a telecommunications network and to store management data arriving at said at least one input port when said telecommunications output is in use in said buffer memory element, temporarily.

There may be a single telecommunications connection operable at any one time arranged to link a plurality of devices to a remote monitoring station via the telecommunications network. There may be between any two of the following number of devices connected to the data management apparatus: 2, 10, 20, 30, 31 or more.

The data management apparatus may include a processor that may be arranged to determine whether the telecommunications connection is in use. The data management centre may include a buffer memory that may be arranged to store the data should the telecommunications connection be in use. The data management apparatus may contain the buffer memory.

The data management apparatus may include a logging device. The logging device may be arranged to record details of data either entering or exiting the data management apparatus. The logging device may be arranged to record data either entering or exiting the data management apparatus. The logging device may be the memory element.

The data management apparatus may include a sensor or a monitor that may be arranged to monitor the status of at least one parameter that may be indicative of the status of at least one device, or part of, the data centre.

The data management apparatus may include a logging device, which may or may not be the same as the first logging device. The logging device may be arranged to record at least one parameter that may be indicative of the status of at least one device, or part, of the data centre. The parameter may be provided in the form of a numerical value or an alphanumeric string.

The host devices may be arranged to be connected to the disc unit by a fibre channel switch. The data network may be an Ethernet network.

The host devices and/or the data management apparatus may be arranged to receive telecommunications signals typically from the telecommunications network. The data management apparatus may be arranged to evaluate incoming telecommunications signals and may be arranged to direct them via the data network to a device for which they are intended. The signals may be intended for the data management unit, a fibre channel switch, a disc array or a host device. The signals may include configuration data.

The memory unit may include a hard disc, or discs, and may include a controller. The hard disc(s) may have an aggregated data storage capacity of at least any one of the following: 50 GB, 100 GB, 200 GB, 500 GB, 1TB.

The data management apparatus may include PCI cards. The PCI cards may be arranged to be connected to an Ethernet, the data network, the telecommunications network. The processor may be arranged to interrupt the PCI cards, typically to interrogate them to ascertain if they are in use.

The data management apparatus may include a plurality of discs arranged in a fault tolerant RAID configuration. The data management apparatus may include input means that may be arranged to enable configuration data to be uploaded into the apparatus. The input means may be a universal serial bus (USB) connection or it may be a PCI card. The USB connection may be arranged for the connection of input elements, such as for example, a mouse or a keyboard, to the data management apparatus. There may be provided an installation device that may be arranged to connect to the input means. The installation device may be arranged to upload a network address (for example an internet protocol (IP) address) for any one of the following: any one of the host devices, a fibre channel switch, a gateway, a disc array, the data management apparatus. The installation device may include manually operable selection means. The installation device may include a display. The display may be arranged to display visual representations of the network and/or the configuration data. The selection means may be arranged to select the data and a network element to which it relates. The display may be an LCD display. There may be provided a keyboard and/or a mouse associated with the installation device that may at least in part constitute the selection means. Preferably, the selection means may be a keypad that may be mounted upon the installation device.

The telecommunications connection may be a permanently open telephone line. The telecommunications link may be to a public switched telecommunications network (PSTN), a public switched data network (PSDN) or an integrated services digital network (ISDN).

The data network may be within a firewall. The data management apparatus may be within the firewall.

There may be a wide area network (WAN) including a data centre according to the second aspect of the present invention, a telecommunications connection and a remote monitoring station.

The telecommunications connection arranged to transfer data between the data centre and the monitoring station. The remote monitoring station arranged to inform a vendor/engineer of a fault/problem associated with a device connected to the data network.

According to a third aspect of the present invention there is provided a method of placing a plurality of electronic devices in communication with a remote monitoring station comprising the steps of:
i) connecting a plurality of network elements to a data management apparatus;
ii) providing the network elements with an identifier;
iii) connecting the data management apparatus to a telecommunications connection;
iv) connecting an individual network element to a remote monitoring station via the data management apparatus and the telecommunications connection.

The method may include providing only a single telecommunications connection or a limited number of telecommunications connections, typically less than 10% of the number of network elements, between the data management apparatus and the monitoring station.

The method may include connecting the network elements to the data management apparatus over a network. The method may include providing the network in the form of an Ethernet. The method may include employing the simple network management protocol (SNMP).

The method may include providing the network elements in the form of any one, or combination, of the following: a memory unit (for example a disc array), a fibre channel switch, a terminal, a gateway. The method may include storing data on the memory unit.

The method may including providing the telecommunications connection in a permanently open state. The method may include utilising a land based telecommunications connection. The method may include providing the telecommunications link in any one, or combination, of the following forms: PSTN, PSDN, ISDN.

The method may include recording a log of all data/signals entering and/or exiting the data management apparatus. The method may include recording all data/signals entering and/or exiting the data management apparatus.

The method may include establishing if a signal/data received by the data management apparatus from the remote monitoring station correlates to the data management apparatus network address or the network address of a network element and forwarding the signal/data to the network address. The method may include providing the network address in the form of an IP address. The method may include storing a database/look up table of network elements network addresses. The method may include adding the network address of a given network element to a signal/data which is originates from said given network element. The method may include multiplexing data/signals from a plurality of network elements and may include outputting the multiplexed data/signal via the telecommunications connection.

The method may include dialing up the data management apparatus via the telecommunications connection. The method may include providing the telecommunications network in the form of a dedicated telephone line.

According to a fourth aspect of the present invention there is provided software which when operating upon a processor causes a data management apparatus to receive signals from a plurality of network elements, determine whether it is necessary to transmit at least one of said signals via a telecommunications connection, format said at least one signal in an appropriate manner so as to make it suitable for transmission via said connection, and transmit said at least one suitably modified signal via said connection.

The software may cause the processor to store the signal in a buffer, typically if the connection is already in use. The software may cause the processor to store a log of signals entering and/or exiting the data management apparatus, typically in a log memory unit. The software may cause the processor to store the signals entering and/or exiting the data management apparatus, typically in a log memory unit. The software may cause the processor to add a network address (for example an IP address) of the network element generating the signal to the signal. The software may cause the data management apparatus to transmit the suitably modified signal to a remote monitoring station.

According to a fifth aspect of the present invention there is provided method of retrofitting a data management apparatus, according to a first aspect of the present invention, configurable to connect to network elements on a network comprising:

connecting said management data distribution apparatus to said network; and connecting said management data distribution apparatus to said telecommunications network via said telecommunications output.

The method may include connecting the data management apparatus to a remote monitoring station via the telecommunications link. The method may include configuring the data management apparatus network details, for example for an Ethernet, this will include setting up a network address (for example an IP address) for the data management apparatus, net mask, gateway and refining these settings as required.

According to a sixth aspect of the present invention there is provided a method of providing a network with a remote upgrade/modification capability comprising:

fitting a data management apparatus to the network;

utilising the data management apparatus to receive incoming instructions via a telecommunications connection; and distributing said incoming instructions over the network to an appropriate network element.

According to a seventh aspect of the present invention there is provided a method of reducing the cost of remotely monitoring a large number of network elements comprising:

connecting a data management apparatus according to the first aspect of the present invention to a network of network elements to be monitored;

utilising the data management apparatus as telecommunication gateway to the networked devices.

The method may include providing only a single telecommunications link from the data management apparatus.

According to an eight aspect of the present invention there is provided a method of remote monitoring of network elements in a data centre comprising having a data management apparatus.

According to a ninth aspect of the present invention there is provided a method of producing a data centre in accordance with the second aspect of the present invention comprising:

providing a data management apparatus;

retrofitting the data management apparatus to a network;

disabling individual telecommunications connections from the devices to the monitoring station; and utilising the data management apparatus as a data conduit between the data network and the telecommunications network.

According to a tenth aspect of the present invention there is provided A wide area network (WAN) including a data centre comprising:

a plurality of data storage devices;

a management data distribution apparatus including:

a control unit, a buffer memory element, at least one input port and a telecommunications output port;

a network including said data storage devices and said distribution apparatus;

said at least one input port being arranged to receive management data relating to at least one of said data serving devices and to pass said management data to said control unit, said control unit being arranged to output said management data via said telecommunications output to a remote monitoring site over a telecommunications network and is arranged to store management data arriving at said at least one input port when said telecommunications output is in use in said buffer memory element, temporarily.

According to an eleventh aspect of the present invention there is provided a method of placing a network element in communication with a remote monitoring station comprising the steps of:

i) connecting each of a plurality of network addresses to a management data distribution apparatus;

ii) receiving management data from at least one of said network addresses at said management data distribution apparatus;

iii) connecting said data management distribution to a remote monitoring station via a telecommunications output and a telecommunications network;

iv) storing management data received whilst said telecommunications output is in use in a data storage medium; and v) outputting management data stored in step (iv) to a remote monitoring station via said telecommunications output from said data storage medium in order of said management data's storage.

According to a twelfth aspect of the present invention there is provided a method of reducing the number of telecommunications links to a data centre comprising the steps of:

i) reporting management data from one of a plurality of data storage devices to a central management data distribution apparatus;

ii) selecting a remote call centre to be connected from a list stored on said apparatus dependent upon which data storage device said management data relates to;

iii) contacting said remote call centre via a single telecommunications link;

iv) storing any further management data received whilst said single telecommunications link is in use; and v) repeating step (ii) and (iii) for any management data stored in step (iv) when said telecommunications link is available for use.

According to a thirteenth aspect of the present invention there is provided a method of retrofitting a management data distribution apparatus including a management data distribution apparatus comprising: a control unit; a buffer memory element; at least one input port; a telecommunications output; said at least one input port being arranged to receive management data from a plurality of devices located within a network and to pass said management data to said control unit, said control unit being arranged to control output of said management data via said telecommunications output to a remote monitoring site over a telecommunications network and to store said management data temporarily in said buffer when said telecommunications output is in use; being configurable to connect to a network comprising:

connecting said management data distributing apparatus to said network; and connecting said management data distribution apparatus to said telecommunications network via said telecommunications output.

According to a fourteenth aspect of the present invention there is provided a management data distribution apparatus comprising:

a control unit;

a data storage device;

at least one peripheral components interconnect port;

a modem;

said at least one peripheral components interconnect port being arranged to receive management data from a plurality of data storage device arrays located within a network and to pass said management data to said control unit, said control unit being arranged to control output of said management data via said modem to a remote monitoring site over a public switched telecommunications network and to store said management data temporarily in said data storage device when said modem is in use.

According to a fifteenth aspect of the present invention there is provided a data centre comprising:

a plurality of data storage device arrays;

a management data distribution apparatus including:

a control unit, a data storage device, at least one peripheral components interconnect port and a modem;

a network including said data storage device arrays and said distribution apparatus;

said at least one peripheral components interconnect port being arranged to receive management data relating to at least one of said data storage device arrays and to pass said management data to said control unit, said control unit being arranged to output said management data via said modem to a remote monitoring site over a public switched telecommunications network and to store said management data temporarily in said data storage device when said modem is in use.

According to a sixteenth aspect of the present invention there is provided a method of placing a disc array in communication with a remote monitoring station comprising the steps of:

i) connecting each of a plurality of data storage device arrays to a management data distribution apparatus;

ii) receiving management data from at least one of said data storage device arrays at said management data distribution apparatus;

iii) connecting said data management distribution to a remote monitoring station via a modem and public switched telephone network;

iv) storing management data received whilst said modem is in use in a data storage device; and v) outputting management data stored in step (iv) to a remote monitoring station via said modem from said data storage device in order of said management data's storage.

According to a seventeenth aspect of the present invention there is provided a method of reducing the number of telephone lines to a data centre comprising the steps of:

i) reporting management data from one of a plurality of data storage device arrays to a central management data distribution apparatus;

ii) selecting a remote call centre to be connected from a list stored on said apparatus dependent upon which apparatus said management data relates to;

iii) contacting said remote call centre via a single telephone line; iv) storing any further management data received whilst said single telephone line is in use; and v) repeating step (ii) and (iii) for any management data stored in step (iv) when said telecommunications link is available for use.

According to an eighteenth aspect of the present invention there is provided a method of reducing the cost of operating a data centre comprising the steps of:

i) monitoring performance metrics of at least two data storage devices owned by at least two entities;

ii) generating respective management data sets for each of said at least two data storage devices;

iii) outputting each of said respective management data sets to respective remote monitoring stations using a single telecommunications output, spaced apart in time.

According to a nineteenth aspect of the present invention there is provided a management data distribution apparatus comprising:

an input arranged to receive management data from each of a plurality of network elements;

a telecommunications output arranged to output a portion of said management data to a remote monitoring station out-of-band; and a buffer memory element arranged to store management data received at said input whilst said portion of said management data is output.

According to a twentieth aspect of the present invention there is provided a method of distributing management data comprising the steps of:

i) receiving management data at an input from each of a plurality of network elements; and ii) outputting said data out-of-band in a first in first out manner to appropriate remote monitoring stations.

DETAILED DESCRIPTION OF THE PREFERRED EMBODIMENT

It will be understood that the term management data is used to encompass data generated by a storage device, or other network element, in relation to its status that can be used by engineers for diagnostic and fault tracing purposes. Management data does not relate to primary data, i.e. data that is retained upon a storage device that is intended for retrieval by a general user under normal operation.

Typical forms of management data for a disc array include data relating to physical orientation, its temperature, read or write errors for each disc of the disc arrays monitored, disc failure monitored, and any other parameter or value which may be helpful to indicate a need to repair or maintain the device.

More generally management data for a data storage device can include spare unused capacity of the device to perform it's function or, conversely, the utilisation level of the device, bit error rate data, status of the device's power supply, data rate of a telecommunications link with the device, bandwidth required by a device.

In particular, data relating to the bit error rate of a device is useful, as an increase in the bit error rate can be an early indicator of impending device failure. Similarly, a decrease in the data rate across a telecommunications link with the device can indicate a device failure, particularly if the data rate falls to zero as this can indicate a catastrophic device failure.

The use of a separate, distinct, secondary interface, typically an Ethernet connection, for the accessing and transmission of management data other than the primary interface, typically a small computer systems interface (SCSI) or fibre channel, used for accessing primary data allows the management data to be out-of-band of primary data channels. This means that the transfer of management data does not impose upon the bandwidth available for primary data transfer and thereby maintains primary data transfer at as high a data transfer rate as possible. Thus such an arrangement is preferable to an in-band network configuration where both the primary data and the management data are transferred over a single primary network interface as part of the bandwidth nominally available for primary data transfer is occupied by the secondary, management, data.

Figure 1:
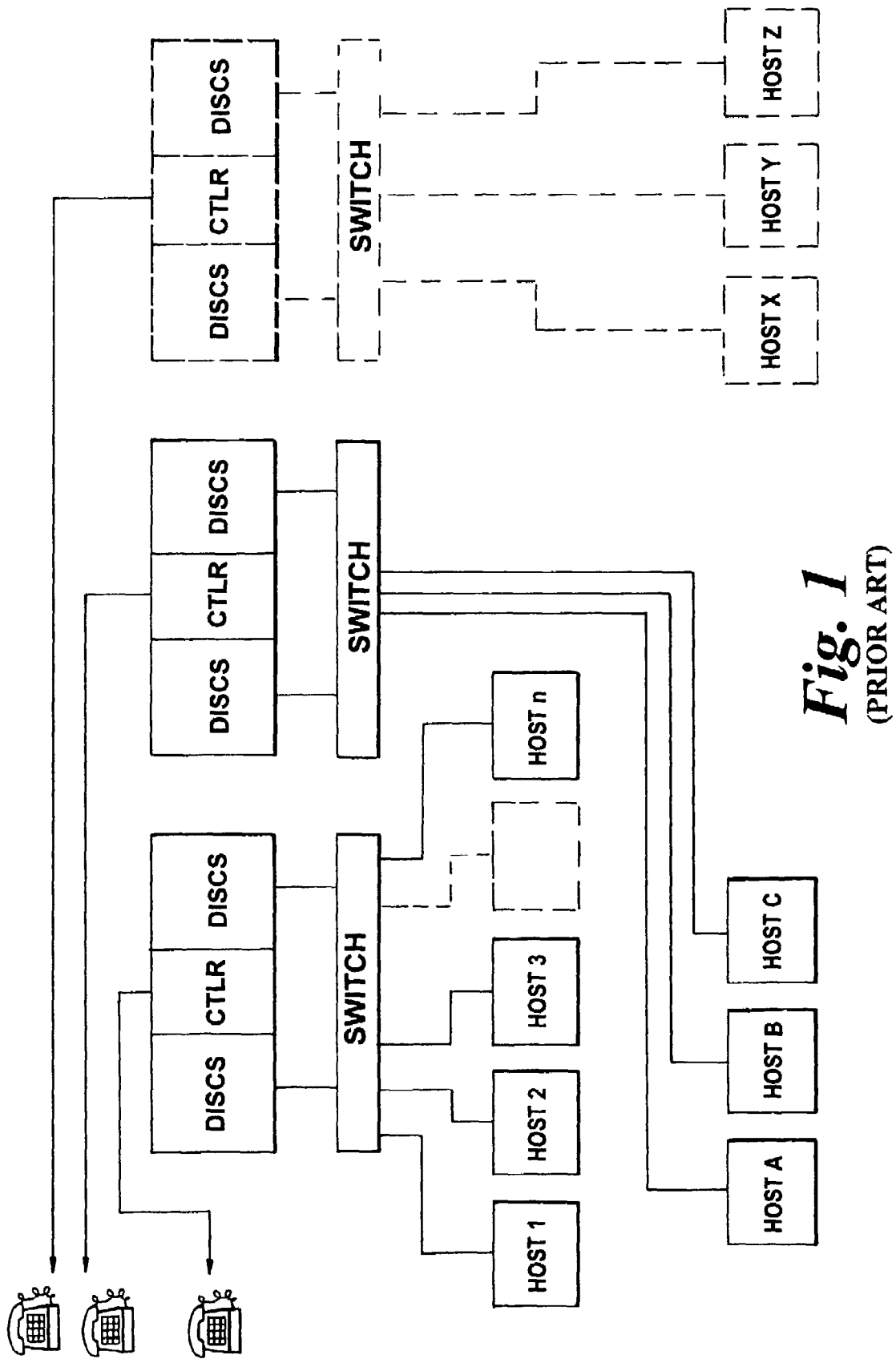
FIG. 1 is a schematic representation of a prior art data management centre.

Referring now to FIG. 1, this shows a prior art arrangement of data storage facility. Data from a range of external hosts is routed via a fibre channel switch to high quality hard disc arrays. These disc arrays are usually sensitive to their surroundings and have a storage capacity of about 1 TB. The fibre channel switch typically has between 16 and 32 ports, which increases fan out from the disc array, which typically has between 8 and 32 ports. A disc controller regulates the distribution of data to the discs and also monitors the discs data channels and the disc surroundings for any faults or problems.

Data management apparatus according to the first aspect of the present invention is hereinafter referred to as a multiplexing autodialler or an autodialler.

Figure 2:
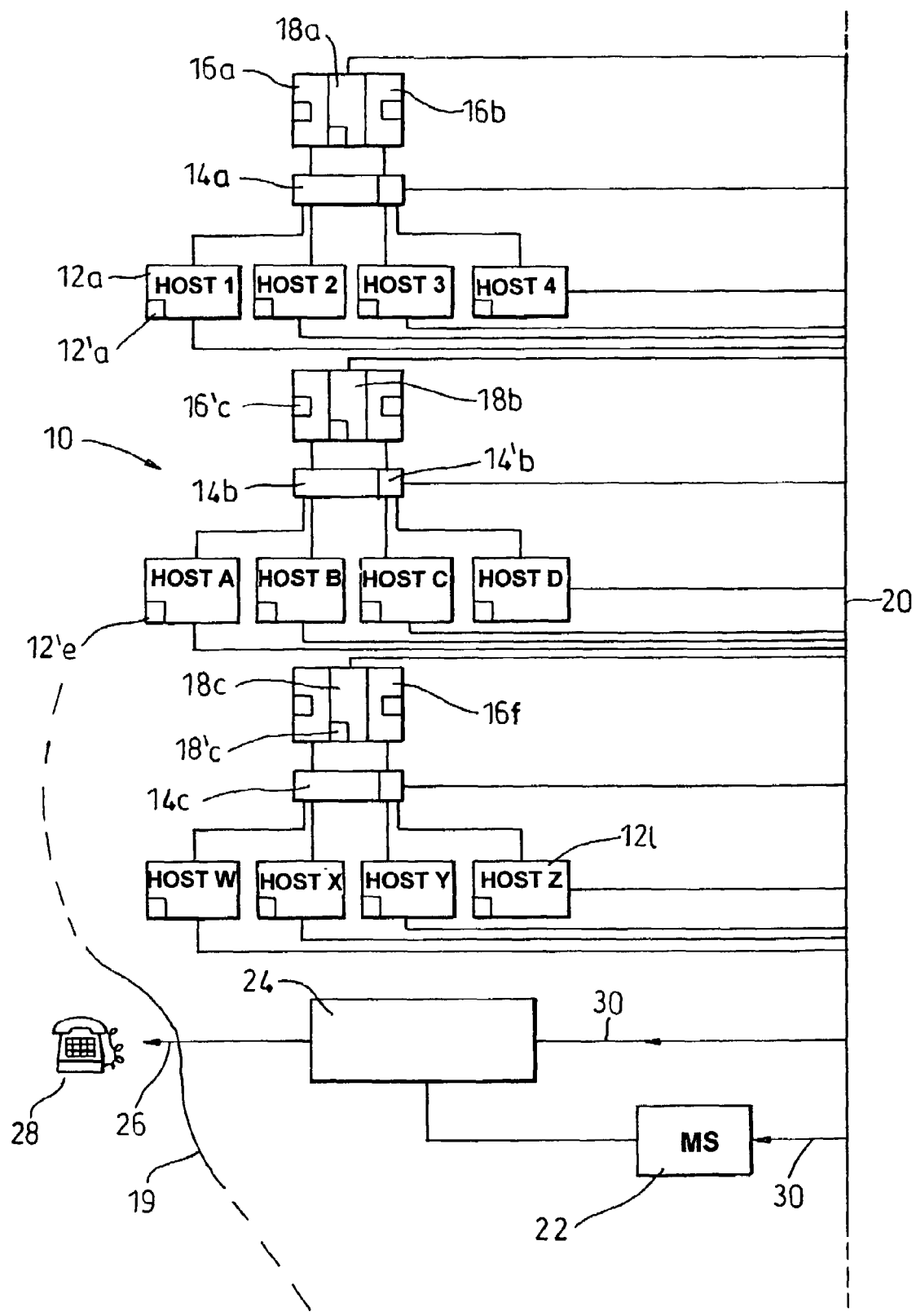
FIG. 2 is a schematic of an embodiment of a data management centre according to an aspect of the present invention.

FIG. 2 shows a secure data storage network 10 comprising hosts 12a-l fibre channel switches 14a-c, hard disc arrays 16a-f, disc controllers 18a-c a network spine 20, a firewall 19 a network management server 22 and a multiplexing autodialler 24.

The hosts 12a-d, 12e-h, 12i-l are connected to their respective fibre channel switches 14a, 14b, 14c in the conventional manner. The hosts 12a-i are also connected directly to the network spine 20, typically via ethernet connections.

Similarly, the fibre channel switches 14 a-c are connected to their respective hard disc arrays 16a,b, 16c,d, 16e,f in a conventional manner. The fibre switches 14a-c are connected to the network spine 20, again typically via ethernet connections.

The disc controllers 18a-c are connected to the network spine 20.

The management server 22 and the multiplexing autodialler 24 are connected to each other and also independently to the network spine 20. The autodialler 24 has a dedicated telephone link 26 to a service centre 28. The telephone link 26 will typically be a public switched data network (PSDN) link to the service centre 28 or it may be a public switched telephone network (PSTN) link. The telephone link 26 may be permanently open, or there may be a dial up connection between the server 22 and the service centre 28.

In use, each of the hosts 12a-l fibre channel switches 14a-c, and especially the disc controller 18a-c have monitoring software 12'a-l, 14'a-c, 18'a-c running thereupon. Should the monitoring software 12'a-l, 14'a-c or 18'a-c note a fault upon any network element 12a-l, 14a-c, 18a-c a signal 30 is sent to the management server 22 and the autodialler 24 via the network spine 20 by the software 12'a-l, 14'a-c, 18'a-c running on the respective network element.

Typical errors that may cause a signal 30 to be sent to the server 22 and autodialler 24 include variations in humidity or temperature beyond permitted tolerances, a change in orientation of a disc drive, disc drive failure, a repeated write or read error to/from a disc, connection problems between network elements, fire or flood alarms, tape drive failures, data backup events/failure, TapeAlert conditions and informational events from the network infrastructure (e.g. network link failed or network gateway disappeared).

The signal 30 will identify the faulty network element typically by an internet protocol (IP) address or any other convenient identities and contain details of the nature of the fault.

The signal 30 arrives at the autodialler 24, described in detail hereinafter, and activates the telephone link 26 to the call centre 28. The identity of the faulty network element and the nature of the fault are relayed to the call centre 28 for assessment by an engineer.

The telephone link 26 can be configured to allow only outgoing calls for increased network security or it can be configured to allow limited access from the call centre 28 to authorised personnel, for example with a valid user identifier and password, in order that firmware operating inside the autodialler 24 can be remotely updated, thus reducing maintenance charges for call outs.

As data transfer and routing of data are executed without any connection to the outside of the firewall 19 being necessary the network 10 allows increased redundancy of system components without compromising data integrity and security with the use of a single telephone link 26 to the service centre 28 reducing the number of possible points of attack compared to the prior art arrangements and thereby increasing data security still further.

Figure 3:
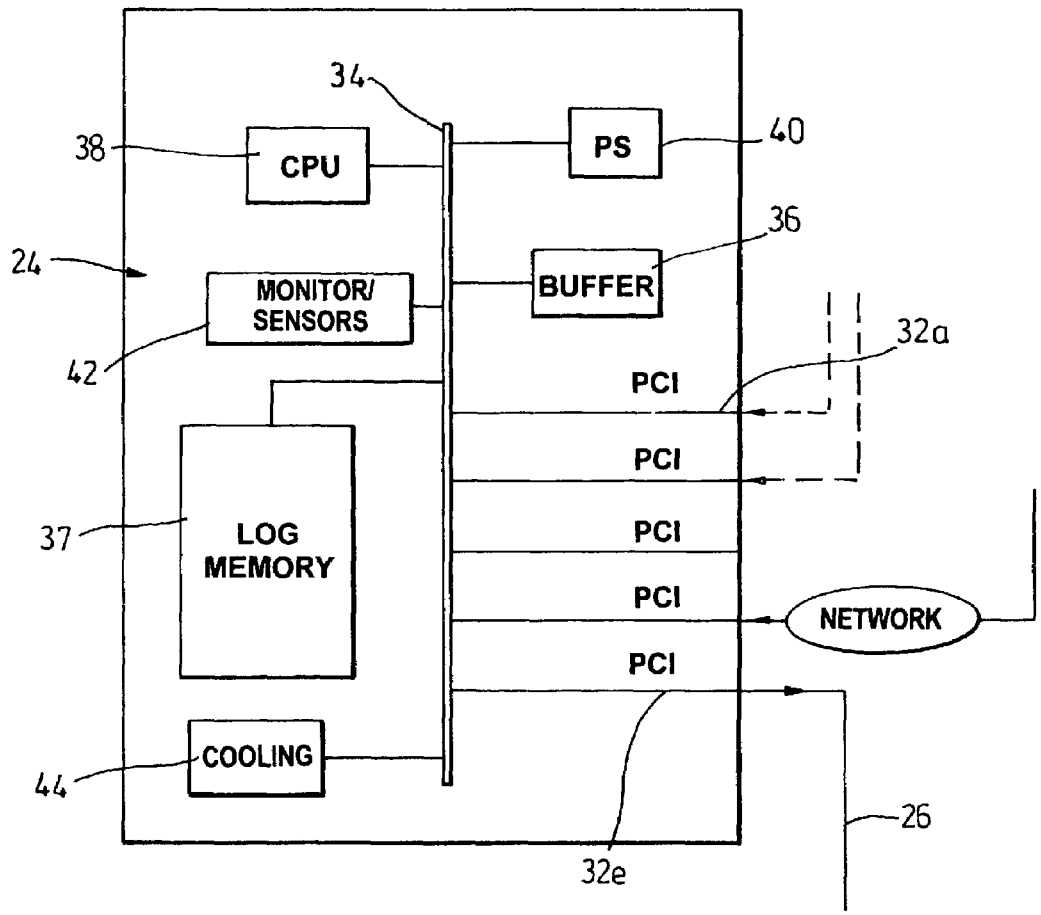
FIG. 3 is a schematic representation of an embodiment of a data management apparatus according to an aspect of the present invention.

Referring now to FIG. 3, a multiplexer autodialler 24 comprises a plurality of peripheral component interconnect (PCI) input/output (IO) ports 32a-e, a bus 34, a buffer memory 36, a log memory 37, a processor 38, a power supply 40, a monitor circuit 42 and a cooling element 44.

One of the PCI IO ports 32d is a network link (e.g. Ethernet link) to the network spine 20 and another of the PCI IO ports 32e is the connection point for the telephone link 26 to the service centre 28. The remaining PCI IO ports 32a-c are typically used to upload data to the autodialler 24, download activity logs from the autodialler 24 or to serve as direct connections to any of the elements present on the network 10.

The PCI IO ports 32a-c can be used as reserve input lines from the ethernet or as reserve output lines to the telephone link 26 to increase redundancy within the network 10. A device, for example a disc controller, may require a direct connection to the autodialler 24 if it is particularly crucial to a clients database, handles particularly sensitive data or a large volume of data.

A data signal, for example the fault signal 30, enters the autodialler along one of the PCI IO ports 32a-d, either from a direct link or via the network spine 20. The data is passed onto the bus 34 where the processor 38 assesses the current autodialler status. This status assessment includes checking the monitor circuit 42 which typically monitors the power supply 40, the level of the buffer 36 and the state of the activity of the PCI IO ports 32a-e, in particular the PCI IO port 32e which is connected to the telephone link 26.

If the processor 38 receives notification from the monitor circuit 42 that the PCI IO port 32e is busy the processor 38 directs the data to be stored in the buffer 36 temporarily. The buffer 36 is typically a few MB to a few GB in order that a number of data signals can be stored sequentially, in order of their arrival. The purpose of the buffer 36 is so that the autodialler 24 does not appear to be busy when a fault signal is input to one of the PCI IO ports 32a-d even if the output PCI IO port 32e is in use.

Once the call to the service centre 28 that is occupying the PCI IO port 32e is completed the next data set stored in the buffer 36 is output via the PCI IO port 32e, i.e. the buffer 36 acts as a "first in, first out" store of data so that calls to the service centre 28 are dealt with in the order that they are received by the autodialler 24.

Every time a data set is received by or transmitted from the autodialler 24, the processor issues a log command that is recorded in the log memory 37. The log memory 37 is typically a hard disc that is intended to provide a complete and accurate record of the data passed into and out of the autodialler in case, for example a power failure should occur whilst there is data in the buffer 36 that could be lost and also to provide an audit trail in order that fault histories can be analysed to look for recurring faults or trends. It is usual to provide at least two hard discs configured such data placed on any one of the discs is mirrored on the other disc(s), i.e. a RAID 1 arrangement. This arrangement increases the fault tolerance of the autodialler.

Typically, the log disc(s) will be removable to allow for their replacement by non-skilled operators should a fault in one of them occur. Also, should another one of the components of the autodialler 24 fail, other than the disc(s) then, the disc(s) can be removed or placed in a reserve autodialler. This allows a continuous log to be generated using the same discs.

It will be appreciated that if a high level of redundancy is required with the autodialler some or all of the primary components, i.e. processor, memory log, buffer, bus, PCI IO ports, and power supply, will have identical reserve components which can be engaged should the monitor circuit 42 detect a fault associated with any specific component.

A different service centre 28 may serve each disc array 16a-f and they will therefore have a differing telephone numbers that must be dialled by the autodialler 24 in the event of a fault being logged. In order to achieve this each PCI IO card 32a-d has its status checked by the processor 38 when a fault signal 30 is received by the autodialler 24 using embedded operating systems interrupt handling. The processor 38 reads the device i.d. from the data signal and obtains the appropriate telephone number for the device from a look up table which is typically stored in non-volatile RAM of the autodialler 24 during a set up procedure, described hereinafter, or during an upload of data from the call centre 28, as described hereinbefore. The telephone number is used immediately to access the telephone link 26 to the appropriate call centre 28 if the telephone link is not in use. However, if the telephone link 26 is in use the telephone number is appended to the data signal 30 and is stored in the buffer with the data signal 30 so that the correct call centre 28 can be dialled at a later point in time, with the processor 38 removing the appended telephone number and using it to dial the appropriate call centre.

Figure 4:
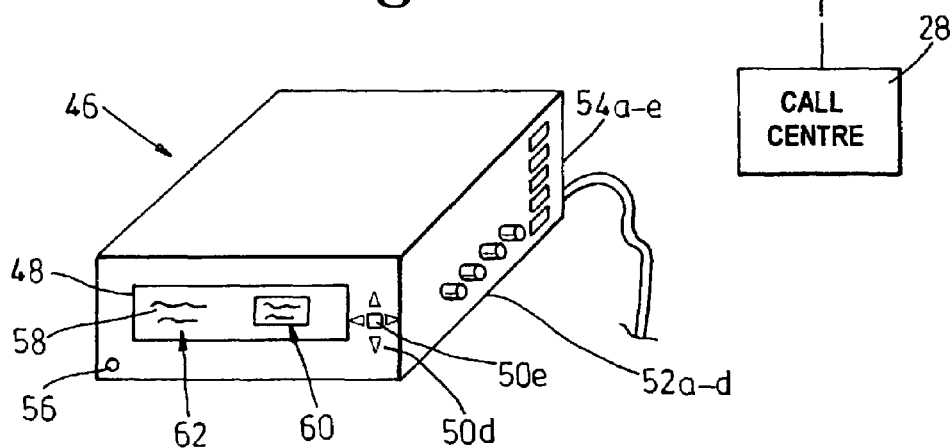
FIG. 4 is a drawing of an embodiment of a mobile configuration installation device according to an aspect of the present invention.

The autodialler 24 will typically be a PC processor box running on appliances operating systems such as linux or embedded windows. This operating system can be updated via the telephone link 26 from the call centre 28. Alternatively, it can be updated locally using a management console 46, as shown in FIG. 4. The management console 46 comprises an LCD screen 48, an array of buttons 50a-e, a co-axial connections 52a-d, universal serial bus (USB) ports 54a-e, and a peripheral port 56.

The management console 46 typically connects to one of the PCI IO ports 32a-c via either a network connection or a telephone line. The screen 48 displays for example, network configuration parameters 58 for example for Ethernet, the IP address, netmask and gateway to be assigned if the telephone link is not in use to the autodialler 24. A user of the console 46 navigates through menus 60 and other text 62 using the directional keys 50a-d and confirms any selection they make using the enter key 50e. alternatively, a keyboard and/or mouse (not shown) can be connected to the console 46 via the peripheral port 56. This enables the direct entry of text and/or the navigation of menus 60 and text 62. It is possible to manage transaction logs, purge old entries, obtain performance statistics and carry out trend analyses via the console 46.

The coaxial connectors 52a-d allow the console to be connected to a screen (not shown) or other devices for example network ports, switches and telecommunication output lines from other devices, and the plurality of USB ports 54a-e allow more than one autodialler to be configured from a single controller.

It will be appreciated that whilst "phone home" arrangements are common in the more expensive "high end" disc arrays they are not as common in "low" to "mid-range" disc arrays because of the cost of maintaining many individual telephone connections for disc arrays. However, if a single telephone connection can be used for many disc arrays, as exemplified by the present invention, this financial impediment to the use of "phone home" arrangements is removed. Indeed, it is possible that multiple user organisations could share the cost of a single multiplexing autodialler and telephone link.

It will also be appreciated that such data management systems and remote monitoring systems are not only applicable to disc arrays but also to tape drives and/or tape drive libraries.

Figure 5:
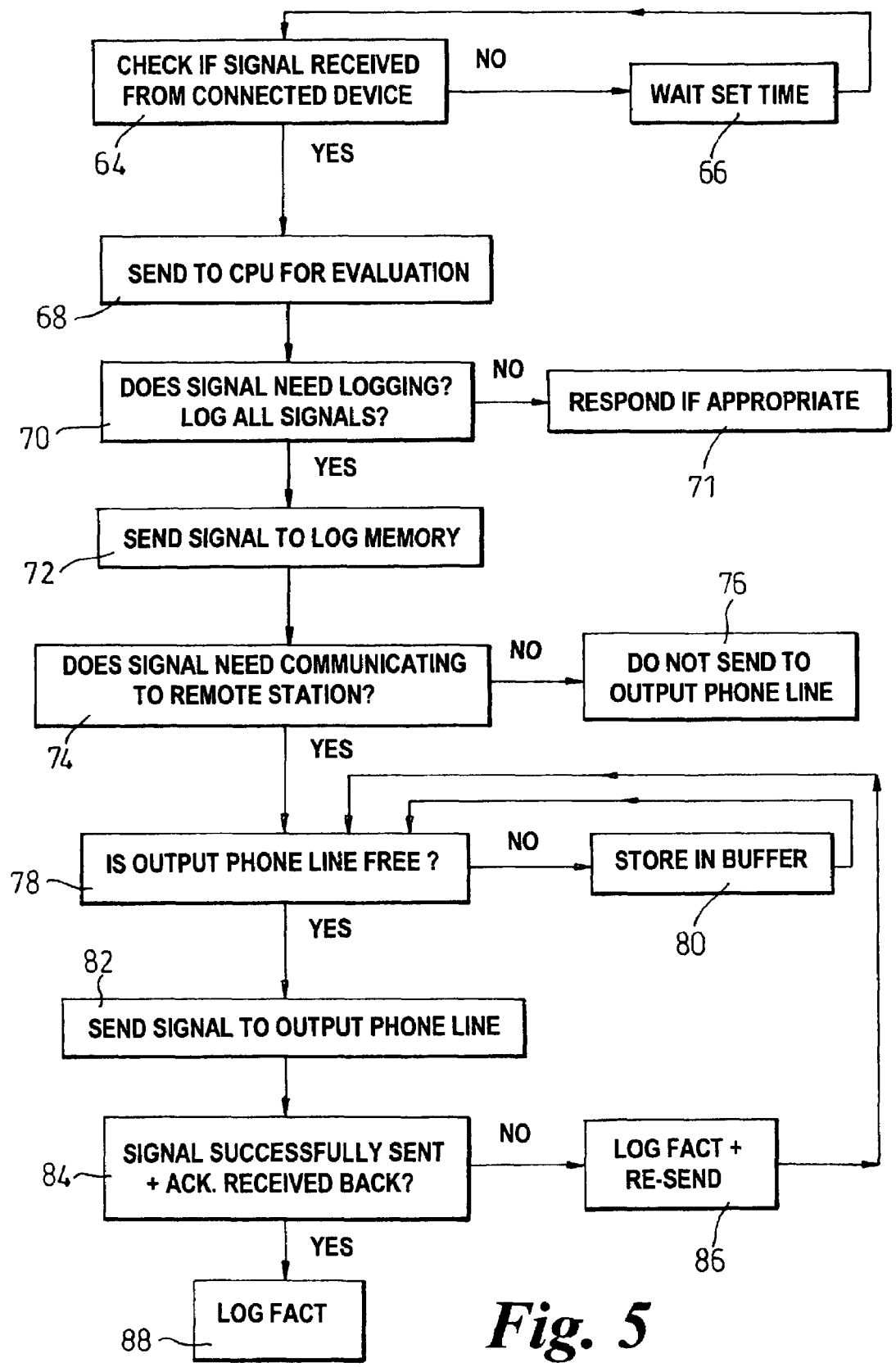
FIG. 5 is a flowchart detailing a method of data management and remote monitoring in accordance with an aspect of the present invention.

Referring now to FIG. 5, this is a flow diagram detailing one method of remote monitoring of computer systems using a multiplexing autodialler 24.

The processor 38 of the autodialler 24 interrupts the PCI IO port to check if a signal has been received from a connected device (step 64). If no signal has been received the processor waits a predetermined amount of time, typically a few seconds, (Step 66) before again checking if a signal has been received (step 64). However, upon a signal being received it is sent to the processor 38 for evaluation. (Step 68). The processor 38 determines whether the signal requires logging (step 70) and if it is not necessary to log the signal the autodialler 24 sends a signal to the device, if appropriate (Step 71) for example if a disc array is currently undergoing test or development and is not in on-line use.

Should the signal require logging it is logged to the log memory 37 (Step 72). The processor 38 this determines whether the signal needs communicating to the call centre 28 (step 74), if not, no further action is taken (step 76). If the signal needs to be communicated to the call centre 28 the processor checks to see if the telephone link 26 is in use (step 78). If the telephone link 26 is in use the signal is stored in the buffer (step 80) and the processor 38 rechecks the availability of the telephone link 26 after a set time, typically a few seconds. If the telephone link 26 is free a telephone number appropriate for the device is dialled and the signal is sent, to the call centre 28 via the telephone link 26. (step 82).

The processor 38 issues an interrupt to determine if the signal has been successfully sent to the call centre 28 (step 84). If the signal has been successfully sent to the call centre this fact is logged (step 86). However, if the signal has not been sent to the call centre this fact is logged in the log memory and the signal resent (step 88).

Figure 6:
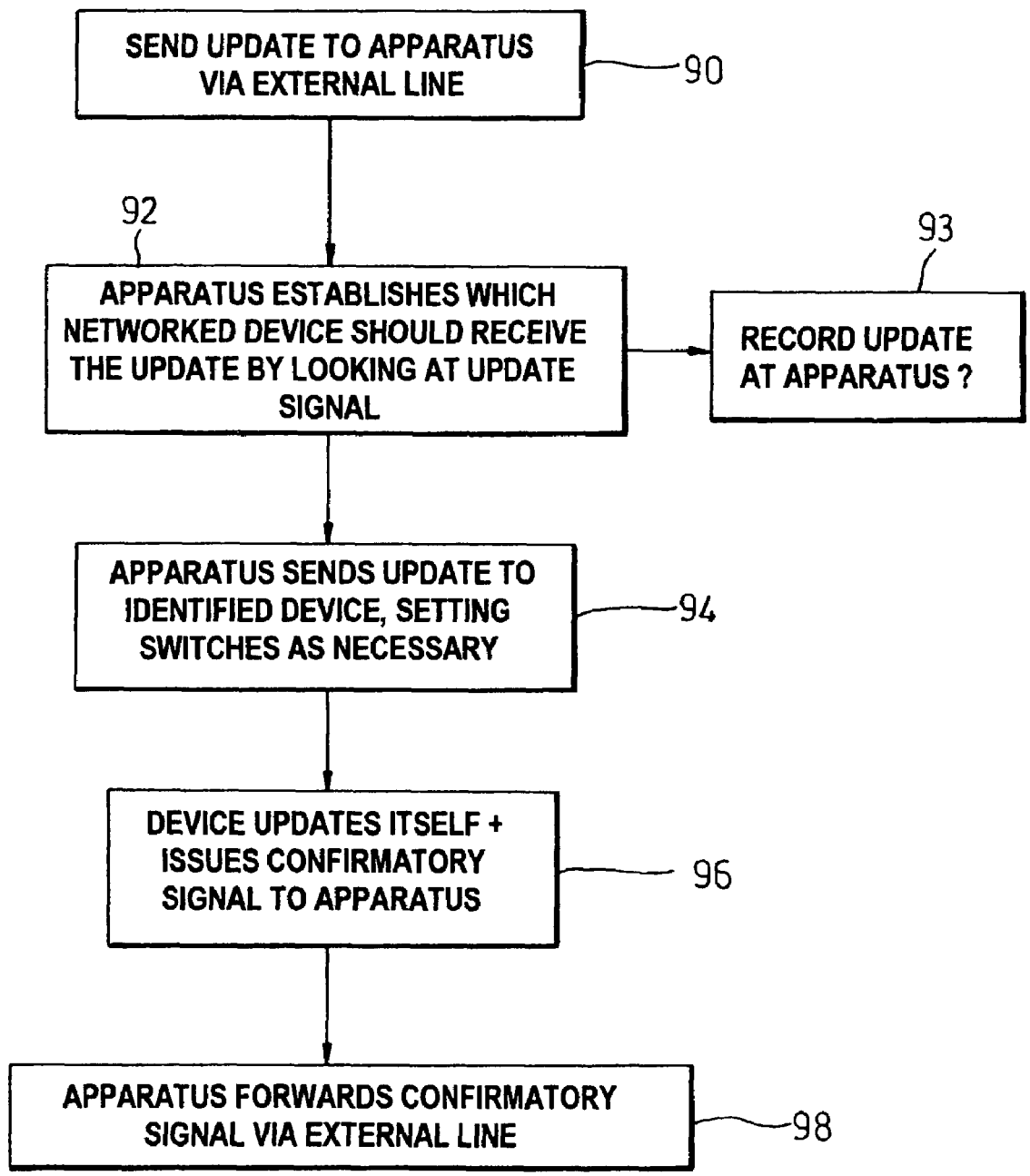
FIG. 6 is a flowchart detailing a method of updating a networked device via the data management apparatus of FIG. 3.

Referring now to FIG. 6 this is a flow diagram of a method of updating software and/or firmware contained in a device. An update is transmitted to the autodialler 24 from the call centre 28 via the telephone link 26. (step 90). The autodialler 24 identifies which device requires updating (step 92) typically by reading a header portion of the signal. The autodialler 24 itself may require updating or it could be any other device connected to the network spine 20. The processor 38 decides whether to record the update of the memory 37 (step 93). This allows either some or all of the updates to be stored so as to have a record of any updates performed for audit or other purposes.

The autodialler 24 issues the update to the device identified (step 94) from the previous step. The device is updated and issues a confirmation signal to the autodialler 24 (step 96) which itself then issues a confirmation signal to the call centre 28 via the telephone link (step 98).

Figure 7:
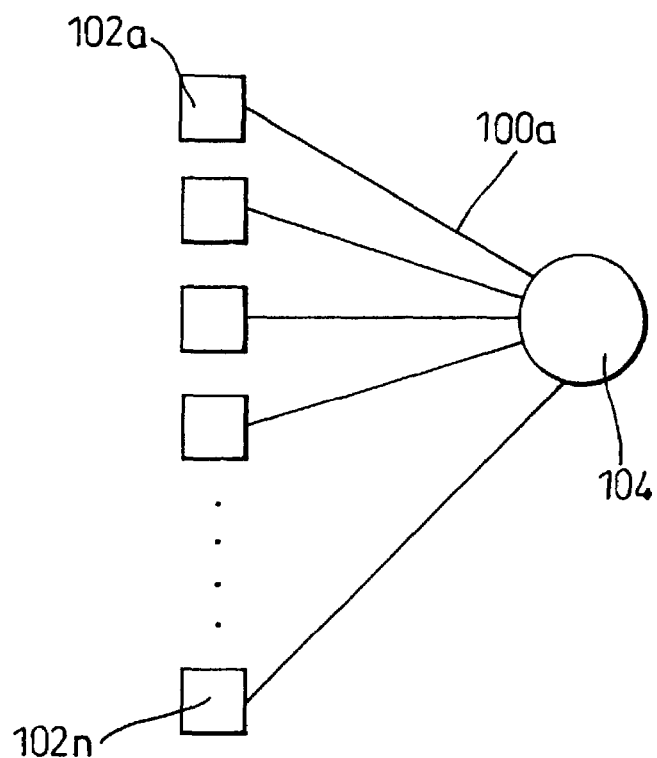
FIG. 7 is a schematic representation of a detailing cost saving arrangement according to an aspect of the present invention.
Figure 7:
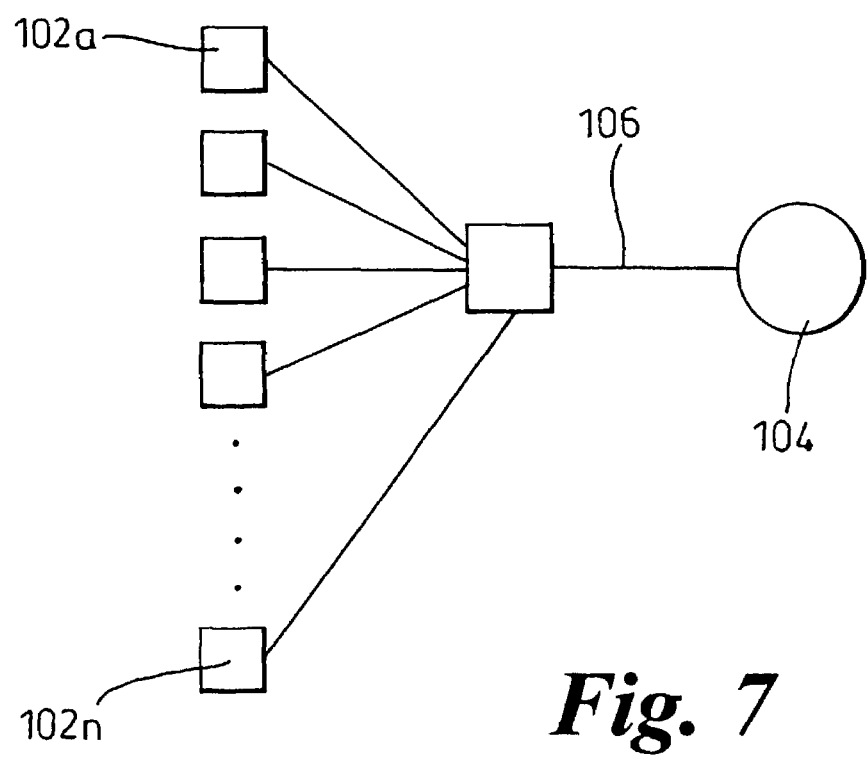

Referring now to FIG. 7, a plurality of telephone connections 100a-n from devices 102a-n from devices in a data management centre 104 can be reduced in number, typically to just a few telephone connections or, as shown, to a single telephone connection 106 from the devices 102a-n using a data management apparatus according to an aspect of the present invention, thereby reducing costs.

It will be appreciated that the network element may comprise discrete physical, addressable devices, but could, additionally or alternatively, comprise network addressable logical connections.

What we claim is:

1. A management data distribution apparatus comprising:

a control unit;
a buffer memory element;
at least one input port;
a telecommunications output;
said at least one input port being arranged to receive management data from a plurality of devices located within a network and to pass said management data to said control unit, said management data comprising status data of the devices to enable diagnostics of the devices, said control unit being arranged (i) to control output of said management data via said telecommunications output to a selected one of plural remote monitoring sites over a telecommunications network different from said network and (ii) to temporarily store management data arriving at said at least one input port in said buffer memory element when said telecommunications output is in use,
wherein said control unit is arranged to selectively connect said telecommunications output, via the telecommunications network, to different remote monitoring sites based on the management data received from different said devices, respectively; and
said telecommunications output is arranged to be operable at any one time to link said management data distribution apparatus to only one of said remote monitoring sites via said telecommunications network depending on the management data received from a corresponding one of said devices.

2. Apparatus as claimed in claim 1 wherein said buffer memory element is arranged to store said management data in a first in first out queuing arrangement.

3. Apparatus as claimed in claim 2 wherein said buffer memory element is arranged to output said management data via the telecommunications output when said telecommunications output is available for use.

4. Apparatus as claimed in claim 1 wherein said buffer memory element is arranged to output said management data via the telecommunications output when said telecommunications output is available for use.

5. Apparatus as claimed in claim 1 further comprising a logging device arranged to record details of said management data received at said at least one input port.

6. Apparatus as claimed in claim 5 wherein said logging device is further arranged to record details of said management data output at said telecommunications output.

7. An apparatus as claimed in claim 1, wherein said control unit is arranged to
temporarily store the management data in association with a telephone number of said selected remote monitoring site; and
dial the telephone number to connect to said selected remote monitoring site when said telecommunications output is available for transmission of the temporarily stored management data.

8. An apparatus as claimed in claim 1, wherein said control unit is arranged to
append a telephone number of said selected remote monitoring site to the management data being temporarily stored; and
extract the telephone number from the temporarily stored management data, then dial the extracted telephone number to connect to said selected remote monitoring site when said telecommunications output is available for transmission of the temporarily stored management data.

9. A data center comprising:
a plurality of data storage devices;
a management data distribution apparatus including:
    a control unit,
    a buffer memory element,
    at least one input port, and
    a telecommunications output port; and
a network including said data storage devices and said distribution apparatus;
said at least one input port being arranged to receive management data relating to said data storage devices and to pass said management data to said control unit, said management data comprising status data of the data storage devices to enable diagnostics of the data storage devices, said control unit being arranged (i) to output said management data via said telecommunications output port to a selected one of plural remote monitoring sites over a telecommunications network different from said network and (ii) to temporarily store management data arriving at said at least one input port in said buffer memory element when said telecommunications output port is in use,
wherein said control unit is arranged to selectively connect said telecommunications output port, via the telecommunications network, to different remote monitoring sites based on the management data received from different said data storage devices, respectively; and
said telecommunications output port is arranged to be operable at any one time to link said management data distribution apparatus to only one of said remote monitoring sites via said telecommunications network depending on the management data received from a corresponding one of said data storage devices.

10. A data center as claimed in claim 9 wherein said buffer is arranged to store said management data in a first in first out queuing arrangement.

11. A data center as claimed in claim 9 wherein the management data distribution apparatus further includes a logging device arranged to record details of said management data entering said data management apparatus via said input port.

12. A data center as claimed in claim 9 wherein said management data distribution apparatus further includes a logging device arranged to record details of said management data exiting said data management apparatus via said telecommunications output.

13. A data center as claimed in claim 9 wherein said management data distribution apparatus further includes a monitor arranged to monitor at least one parameter indicative of the status of at least one data storage device of said data center.

14. A data center as claimed in claim 13 wherein said management data distribution apparatus further includes a logging device arranged to record said at least one parameter indicative of the status of said at least one data storage device of said data center.

15. A data center as claimed in claim 14 wherein said logging device includes at least one of the following: a hard disc, an optical disc, any other suitable on-line storage device.

16. A data center as claimed in claim 15 wherein the logging device of said management data distribution apparatus includes a plurality of discs arranged in a fault tolerant RAID configuration.

17. A data center as claimed in claim 9 wherein said management data distribution apparatus includes an input arranged to enable configuration data to be uploaded into said apparatus.

18. A data center as claimed in claim 9 wherein said telecommunications output port is at least one of:

a permanently open telephone line;

a telephone line which is temporarily operable to communicate management data from said management distribution data apparatus to said remote monitoring site.

19. A data center as claimed in claim 9 wherein said apparatus includes fewer telecommunications outputs than the number of said data storage devices connected to said apparatus.

20. A data center as claimed in claim 19 wherein the number of said outputs is less than any one of the following percentages of the number of said data storage devices connected to said apparatus: 90%, 75%, 50%, 33%, 25%, 15%, 10%, 5%, 1%.

21. A data center as claimed in claim 9 wherein said telecommunications output port is arranged to communicate with the remote monitoring site over a public switched telecommunications network (PSTN), a public switched data network (PSDN) or an integrated services digital network (ISDN).

22. A data center as claimed in claim 9 wherein said network is arranged within a firewall; and said control unit is arranged to output said management data via said telecommunications output port without any connection to the outside of the firewall, thereby increasing redundancy of system components without compromising data integrity and security, while reducing the number of possible points of attack.

23. A wide area network (WAN) including a data center comprising:

a plurality of data storage devices;

a management data distribution apparatus including:
 a control unit,
 a buffer memory element,
 at least one input port, and
 a telecommunications output port; and a network connecting said data storage devices and said distribution apparatus;

said at least one input port being arranged to receive management data relating to at least one of said data storage devices and to pass said management data to said control unit, wherein the management data includes status information of the at least one data storage device to enable diagnostics of the at least one data storage device, said control unit being arranged (i) to output said management data via said telecommunications output port to a selected one of plural remote monitoring sites over a telecommunications network different from said network and (ii) to temporarily store management data arriving at said at least one input port in said buffer memory element when said telecommunications output port is in use, wherein said control unit is arranged to selectively connect said telecommunications output port, via the telecommunications network, to different remote monitoring sites based on the management data received from different said data storage devices, respectively; and said telecommunications output port is arranged to be operable at any one time to link said management data distribution apparatus to only one of said remote monitoring sites via said telecommunications network depending on the management data received from a corresponding one of said data storage devices.

24. A WAN as claimed in claim 23 wherein said management data distribution apparatus includes a number of telecommunications outputs, the number of outputs being less than one of the following percentages of the number of the data storage devices connected to said apparatus: 90%, 75%, 50%, 33%, 25%, 15%, 10%, 5%, 1%.

25. A method of retrofitting a management data distribution apparatus, said management data distribution apparatus comprising:

a control unit;

a buffer memory element;

at least one input port;

a telecommunications output;

said at least one input port being arranged to receive management data from a plurality of network devices located within a network and to pass said management data to said control unit, said control unit being arranged (i) to control output of said management data via said telecommunications output to one of plural remote monitoring sites over a telecommunications network different from said network and (ii) to temporarily store said management data in said buffer memory element when said telecommunications output is in use;

said method comprising:

connecting said management data distributing apparatus to said network via said input port; and selectively connecting said management data distribution apparatus to one of said remote monitoring sites via said telecommunications network and said telecommunications output, depending on the received management data being currently outputted, wherein the selectively connecting comprises:

selecting one of the remote monitoring sites to be connected from a list of multiple remote monitoring sites, dependent upon which network device said received management data relates to;

contacting said selected remote monitoring site via a single telecommunications link defined by said telecommunications output and telecommunications network;

repeating said selecting and contacting steps for any management data temporarily stored when said telecommunications output is available for use.

26. The method as claimed in claim 25, wherein the management data comprises status information of the network devices to enable diagnostic of the network devices.

* * * * *